United States Patent [19]

Schulze

[11] Patent Number: 4,925,485

[45] Date of Patent: May 15, 1990

[54] PROCESS FOR THE ISOLATION OF NOBLE METALS

[75] Inventor: Reinhold Schulze, Hamburg, Fed. Rep. of Germany

[73] Assignee: SKW Trostberg Aktiengesellschaft, Trostberg, Fed. Rep. of Germany

[21] Appl. No.: 686,421

[22] Filed: Dec. 26, 1984

[30] Foreign Application Priority Data

Dec. 27, 1983 [DE] Fed. Rep. of Germany ....... 3347165

[51] Int. Cl.$^5$ .............................................. C22B 11/04
[52] U.S. Cl. ....................................... 423/22; 423/25; 423/27; 423/34; 423/42; 423/24; 75/744
[58] Field of Search .................. 423/22, 24, 25, 27, 423/42, 34; 75/118 R, 118 P, 2, 101 R, 108, 101 BE

[56] References Cited

U.S. PATENT DOCUMENTS 3,473,921 11/1969 Schmuckler ..................... 75/118 R
4,021,264 5/1977 Knorre et al. ..................... 75/118 P

FOREIGN PATENT DOCUMENTS 1336241 11/1973 United Kingdom ........... 75/101 BE

OTHER PUBLICATIONS

Groenewald, T., "The Dissolution of Gold in Acidic Solutions of Thiourea", Hydrometallurgy 1, (1976), pp. 277–290.
Hiskey, J. Brent, "Thiourea as a Lifivant for Gold and Silver", Proceedings from the 110th Al Me Meeting, Chicago, Ill., (1981), p. 83.

*Primary Examiner*—Robert L. Stoll
*Attorney, Agent, or Firm*—Kenneth P. Glynn

[57] ABSTRACT

The present invention involves the isolation or leaching of noble metals from materials containing noble metals, e.g. ores, by treating the noble metal-containing materials with a cyclic thiourea derivative under acid pH conditions. Removal is effected by adsorption onto charcoal or by an ion exchanger, for example. Preferred cyclic thioureas are N,N'-ethylenethiourea and N,N'-propylenethiourea and the acid pH conditions may be achieved by sulfuric acid or hydrochloric acid solutions containing 0.01 to 2.0% by weight of the cyclic thiourea.

13 Claims, No Drawings

PROCESS FOR THE ISOLATION OF NOBLE METALS

BACKGROUND OF THE INVENTION

1. Field of the Invention

The invention relates to a process for the isolation of noble metals from ores or other materials containing the latter by means of a leaching process carried out under acid conditions in the presence of specified thioureas.

2. Prior Art Statement

Nowadays, noble metals are generally isolated by treating their ores with alkaline cyanide solutions, atmospheric oxygen being introduced as an oxidizing agent. Although this method of treatment is used all over the world, it suffers from a number of substantial disadvantages: the highly toxic cyanides constitute an obvious source of danger. The use of dilute cyanide solutions requires large volumes and long reaction times, in some cases extending over 24 hours, which has an unfavorable effect on the production costs of the noble metal. In addition, many ores are cyanide-resistant, that is to say the noble metals present are only dissolved out to a very low and insignificant extent.

Recently, the use of thiourea as a complex-former in the isolation of noble metals has been publicized increasingly, see T. Groenewald, *Hydrometallurgy* 1 (1976) 277–290; J. B. Hiskey, *Proceedings from the* 110*th AIME Meeting,* Chicago, 22–26 (1981), page 83. Such processes are superior in many respects to the processes operating with cyanides, since, for example, the treatment times are substantially shorter and the noble metals can be isolated successfully even from cyanide-resistant ores. The disadvantage is the high consumption of thiourea, resulting from oxidation. In addition, the sulphur which is precipitated renders the material to be leached passive and prevents the achievement of quantitative yields of noble metal.

There has been no lack of attempts to reduce sensitivity of thiourea to oxidation by substitution, without thereby impairing its ability to form complexes with noble metals. Success in this direction has not been achieved, since either the solubility of the reagent has been lost as a result of the substituents, or its capacity to form complexes has no longer been adequate.

The object was therefore to develop a process which does not have the disadvantages described above, but which makes it possible to carry out, at high cost-efficiency, the extraction of noble metals from their ores or from materials containing them.

In this respect, in the present invention, it has been found, surprisingly, that it is possible, by means of cyclic thiourea derivatives, to isolate the noble metals from their ores or the materials accompanying them in a high yield and within very short leaching times.

SUMMARY OF THE INVENTION

The present invention involves the isolation or leaching of noble metals from materials containing noble metals, e.g. ores, by treating the noble metal-containing materials with a cyclic thiourea derivative under acid pH conditions. Removal is effected by adsorption onto activated carbon or by an ion exchanger, for example.

DETAILED DESCRIPTION OF THE PRESENT INVENTION AND THE EXAMPLES

The invention relates, therefore, to a process for the isolation of noble metals in accordance with the main claim, using cyclic thiourea derivatives, as stated.

Cyclic thiourea derivatives which are used preferentially are N,N'-ethylenethiourea or 2-mercaptoimidazoline and N,N'-propylenethiourea. Compared with open-chain, substituted thiourea derivatives, both compounds are distinguished by the fact that they are largely insensitive to attack by oxidation. Thus, no precipitation of sulphur and thereby no passivation of the material to be leached takes place even in the case of prolonged leaching times. After the removal of the noble metal, these solutions can be recycled to the leaching process.

The cyclic thiourea derivatives are used in an acid medium at pH values of preferably less than 6. The acid to be used is unimportant. Normally hydrochloric or sulphuric acid is used, and it is also possible to employ waste acids.

The concentration of the cyclic thiourea derivative in the treatment agent is between 0.01 and 2.0% by weight. It is preferable to use solutions containing between 0.1 and 1.0% by weight.

N,N'-ethylenethiourea normally has a higher rate of dissolution for noble metals than N,N'-propylenethiourea. In addition, the low consumption of reagent when N,N'ethylenethiourea is used has a particularly advantageous effect.

The leaching of the ores containing noble metals is carried out at room temperature or at a slightly elevated temperature, preferably in the presence of oxidizing agents, such as atmospheric oxygen, nitrate ions, hydrogen peroxide or iron-III ions.

It is preferable to adsorb the metal ions from the noble metal solutions on activated carbon. Any type of activated carbon suitable for this purpose can be used. It is also possible to extract the noble metal components by means of ion exchangers.

The following examples are intended to illustrate the invention in greater detail, without limiting it thereto, however.

Example 1

Gold wafers 1 cm$^2$ in area and 1/100 cm thick were treated in each case in a glass flash with 1 liter of a solution containing 10 g of sulphuric acid, 1.5 g of Fe$^{3+}$ and, in case A, 0.5 g of thiourea or, in case B, 0.5 g of N,N'-ethylenethiourea.

The following figures for gold dissolved and reagent consumed were found after a reaction time of 210 minutes at a temperature of 40° C.:

|   | Gold Dissolved | Reagant Consumed |
| --- | --- | --- |
| A | 45.9 mg | 240 mg = 48% by weight |
| B | 45.6 mg | 40 mg = 8% by weight |

Whereas, then N,N'-ethylenethiourea (B) was used, the gold employed was dissolved completely if the leaching was continued, the solution of thiourea (A) exhibited a precipitation of sulphur which prevented further leaching.

Example 2

100 mg of silver pellets of diameter 0.2–0.7 mm were treated by the process indicated in Example 1. 1 liter solutions containing 10 g of sulphuric acid, 1.5 g of trivalent iron and, in case A, 0.5 g/l of thiourea, in case B, 0.5 g/l of N,N'-ethylenethiourea and, in case C, 0.5 g/l of N,N'-propylenethiourea were used in each case.

The following figures were obtained after a reaction time of 210 minutes at 40° C.:

|   | Silver Dissolved | Reagant Consumed |   |   |
|---|---|---|---|---|
| A | 1.7 mg | 238 mg = | 47.6% | by weight |
| B | 73.4 mg | 13.4 mg = | 2.7% | by weight |
| C | 42 mg | 182 mg = | 36.5% | by weight |

The advantage of the substituted thioureas is obvious from the high rate of dissolution of silver. For N,N'-ethylenethiourea it is 43 times as great as for thiourea, and for N,N'-propylenethiourea it is 25 times as great. In the case of N,N'-ethylenethiourea, the extremely low consumption of reagent is also an advantage.

The noble metal solutions of the thiourea derivatives can be worked up by adsorption on activated carbon or ion exchangers, as shown in the following example.

Example 3

In each case 500 ml of the noble metal solution obtained were passed over adsorption columns packed with 5 g of granular active carbon of the type Norit PK 0.25-1.

The entire content of noble metal had been adsorbed by the activated carbon after a treatment time of 15 minutes. The solutions only contained residual contents amounting to less than 0.1 mg/l of noble metal.

Obviously, numerous modifications and variations of the present invention are possible in light of the above teachings. It is therefore to be understood that within the scope of the appended claims, the invention may be practiced otherwise than as specifically described herein.

What is claimed is:

1. In a process for the isolation of noble metals from ores containing noble metals by reaction of noble metals contained in the ores in the presence of a complex former in acid pH solutions, the improvement which comprises using cyclic thiourea as a complex former in the presence of an oxidizing agent.

2. The process of claim 1 wherein said acid pH conditions are created with sulfuric acid.

3. The process of claim 1 wherein said acid pH conditions are created with hydrochloric acid.

4. The process of claim 2 wherein material containing the noble metals is treated in a sulfuric acid solution of 0.01 to 2.0% by weight of N,N'-ethylenethiourea in the presence of said oxidizing agent.

5. The process of claim 2 wherein the material containing the noble metals is treated in a sulfuric acid solution of 0.01 to 2.0% by weight of N,N'-propylenethiourea in the presence of said oxidizing agent.

6. The process of claim 2 wherein the noble metals are isolated from the sulfuric acid solution by adsorption on activated carbon.

7. The process of claim 4 wherein the noble metals are isolated from the sulfuric acid solution by adsorption on activated carbon.

8. The process of claim 5 wherein the noble metals are isolated from the sulfuric acid solution by adsorption on activated carbon.

9. The process of claim 2 wherein the noble metals are isolated from the sulfuric acid solution by means of an ion exchanger.

10. The process of claim 4 wherein the noble metals are isolated from the sulfuric acid solution by means of an ion exchanger.

11. The process of claim 5 wherein the noble metals are isolated from the sulfuric acid solution by means of an ion exchanger.

12. The process of claim 3 wherein the noble metals are isolated from the hydrochloric acid solution by adsorption on activated carbon.

13. The process of claim 3 wherein the noble metals are isolated from the hydrochloric acid solution by means of an ion exchanger.

* * * * *